Patented Dec. 27, 1949

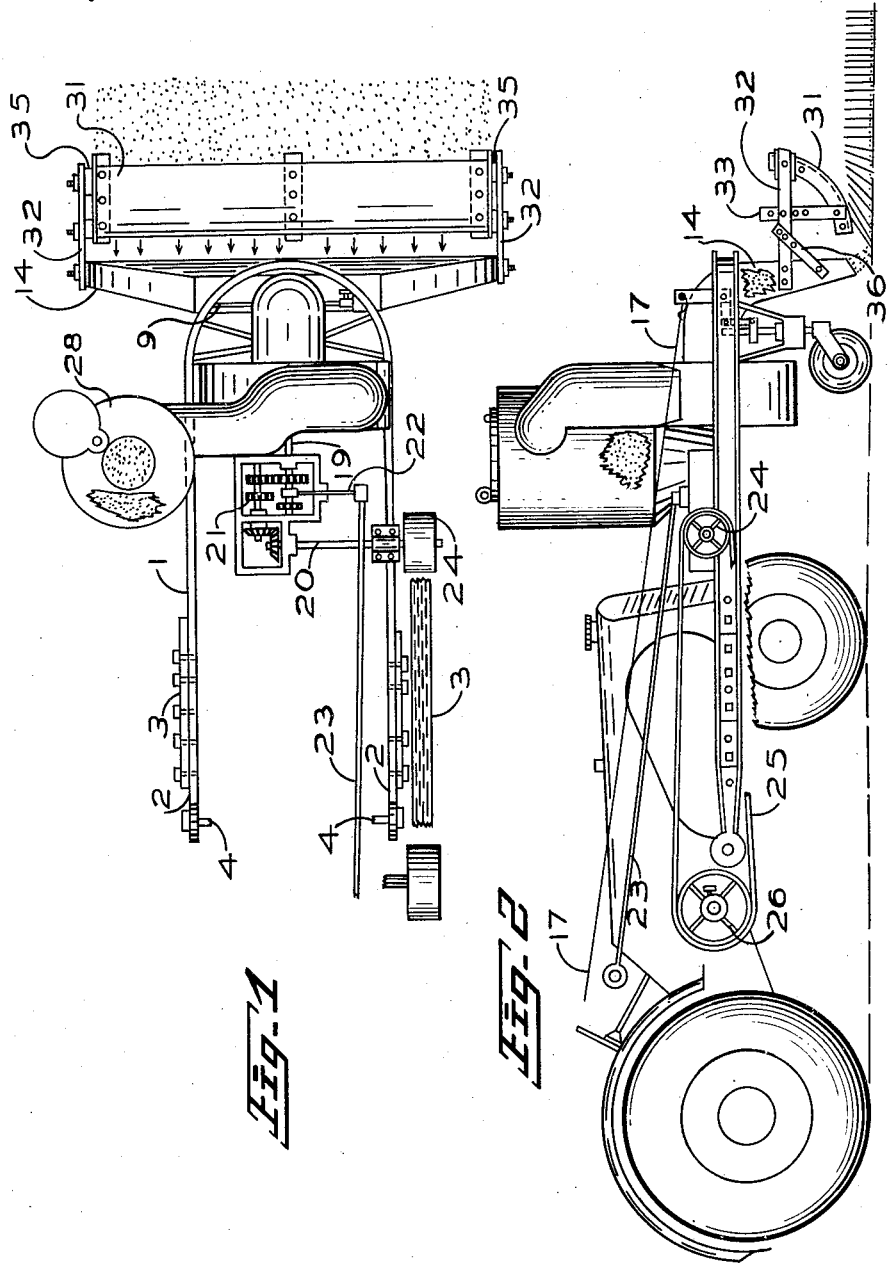

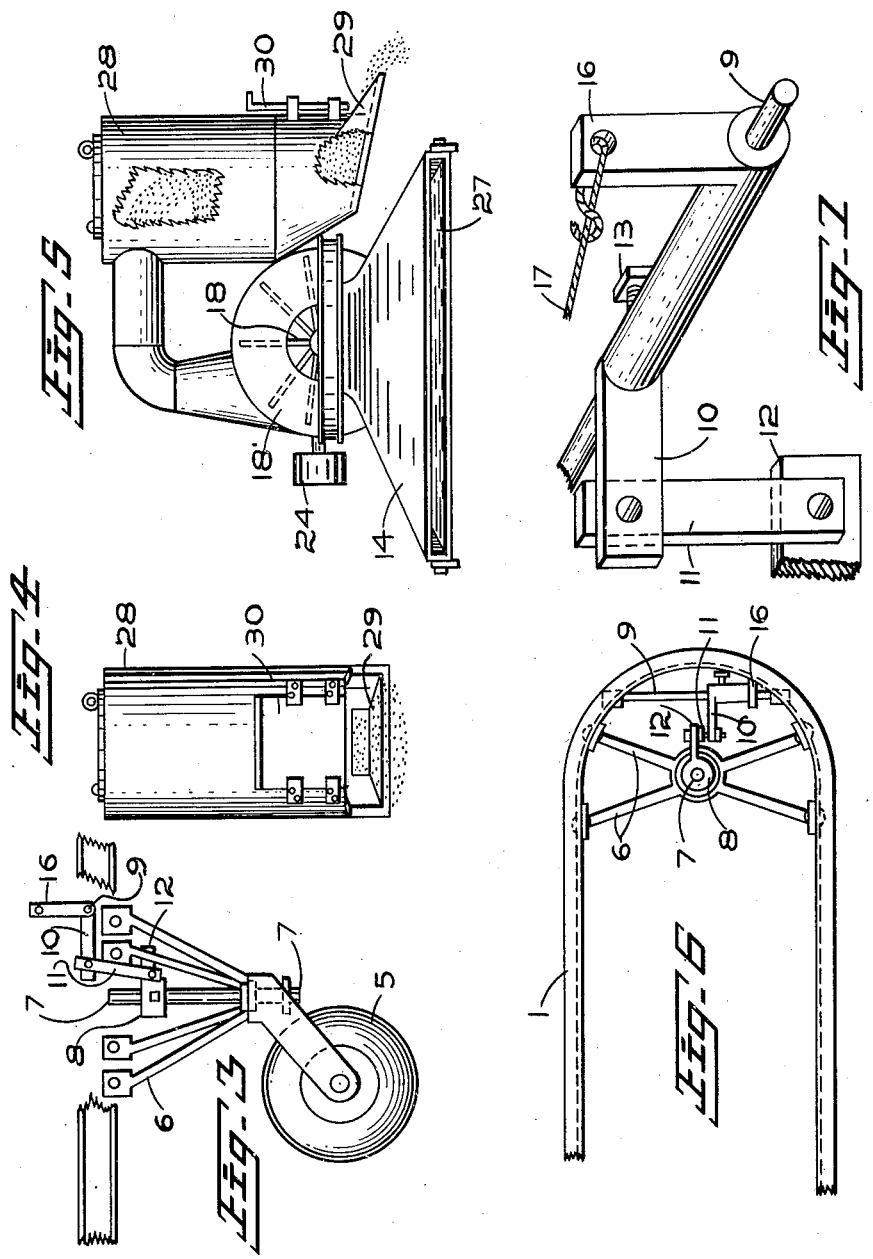

2,492,495

UNITED STATES PATENT OFFICE 2,492,495

WEED SEED COLLECTOR

Frank Lloyd Nelson, Wadena, Saskatchewan, Canada

Application May 10, 1947, Serial No. 747,347

3 Claims. (Cl. 56—19)

My invention relates to weed seed collectors, more particularly having reference to a device to be carried on a tractor for use in advance of a following plowing implement.

In the art to which the invention relates it has been proposed to provide machines employing suction means for gathering insects or seeds from the ground of an agricultural field.

The present invention contemplates improvements in such devices by provision of a suction machine to be carried by a tractor and adapted for use during a plowing operation, the mouth of the collector passing over the ground in advance of the plow or following implement.

One of the objects of the invention is to provide a weed seed collecting machine adapted for mounting on a tractor and capable of use simultaneously with the plowing operation.

A further object of the invention is to provide in the weed seed collecting machine, stubble depressing means by which the mouth of the collector can operate effectively in proximity to the ground.

A still further object of the invention is to provide means for elevation of the intake of the collecting machine to avoid an obstruction.

A still further object of the invention is to provide an adjustable mount for the weed seed collector frame by which it may be mounted on different sized tractors.

A still further object of the invention is to provide a two speed drive for the suction fan of the collector so that the speed of the suction fan may be maintained when the tractor slows down on bad ground.

Other features and advantages of the invention will become apparent by reference to the accompanying description taken in conjunction with the drawings wherein like characters of reference indicate like parts throughout the several views and wherein—

Fig. 1 is a plan view of the weed seed collector taken by itself and including the power take off pulley wheel from the tractor.

Fig. 2 is a side view of a tractor with my improved weed seed collector mounted thereon.

Fig. 3 is a detail side view of the castor wheel and mounting including the connecting elevating mechanism and showing a fragment of the frame bar.

Fig. 4 is a front view of the container for the collector.

Fig. 5 is a front elevation of the weed seed collector taken by itself and without the stubble depressing bar.

Fig. 6 is a plan view of the frame for the collector and including the elevating mechanism.

Fig. 7 is a detail enlarged view of part of the collector elevating mechanism.

Having reference to the drawings, the collector is designed to be carried by a tractor operating in advance thereof. For this I provide a frame comprising a U-shaped bar 1 having secured thereto arms 2—2 by plates 3, by which the bar 1 may be lengthened to accommodate different sized tractors. The U frame bar 1 pivots to the tractor by pins indicated at 4.

Forwardly the U frame bar 1 is supported by a castor wheel 5 secured to the under side of the frame bar by a unitary arm structure or spider 6 that provides four arms that are secured to the frame 1, and a collar in which the shank 7 of the castor wheel is freely movable.

On the shank 7 is fixed a collar 8 by which the frame 1 may be raised at will on the castor wheel to elevate the intake 14 for clearing stones and other obstructions. For this a shaft 9 is provided mounted transversely in the frame 1 in suitable bearing members. On the shaft 9 is a sleeve with integral arm 10 secured in fixed relation on the shaft 9 by a set screw 13. The collar 8 includes an integral lateral arm 12 which pivotally connects to the arm 10 by a link 11. By turning the shaft 9 the frame may be raised on the shank 7.

For effecting elevation of the frame by the driver of the tractor, an integral arm 16 is provided on the sleeve and to which a cable 17 attaches, the cable extending to be used by the operator of the machine.

The weed seed collecting apparatus comprises a fan casing 18' with fan 18 operated by a shaft 19 driven by a shaft 20 through an intervening gearing 21, by which two speeds to the shaft 19 may be obtained, the gearing being shiftable by a lever 22, with rod 23 connecting thereto and extending to be used by the tractor operator. The shaft 20 connects by a pulley wheel 24, belt 25 and pulley wheel 26 on a power take-off from the tractor to be driven thereby.

Communicating with the suction chamber or fan casing 18' is the intake 14 with a wide mouth 27 to cover the full width to be treated. Seed drawn in by the suction means is delivered to a container 28 from which it may be removed through an outlet 29 normally closed by a door 30. The intake 14 may be raised as hereinbefore described, that is by raising the frame 1 pivoted on the pins 4.

For depressing the stubble in advance of the collector a stubble plate 31 is provided carried by arms 32 secured on the intake 14, the plate 31 being supported by bars 33 attached to the arms 32 vertically adjustable thereon to vary the effective height of the plate. Spacers 35 are provided interposed between the bars 32 and plate 31. Braces 36 support the arms 32 on the intake 14 and are adjustable in varying the height of the stubble plate.

In the use of the machine weed seed is collected by the intake 14 to be carried to the container 28 by vacuum means provided by the fan 18. To more effectively draw up the seed without interference by the stubble and permit the intake to operate close to the ground, a plate 31 is provided. It is intended that the device is to be carried and used during plowing operations on the unplowed land. To maintain the speed of the fan 18 when the tractor slows down on bad ground the two speed gear box is provided. For this the lever 22 has been provided on the gear box and operable by the rod 23 extending to the driver's seat.

By the continuous use of this attachment over a period of years, weed seed, particularly mustard and wild oats, may be gradually eliminated.

While I have herein disclosed a preferred embodiment of my invention it is obvious that changes may be made in the construction and arrangement of parts, and such changes in so far as they come within the spirit and scope of the appended claims would be considered a part hereof.

What I claim and wish to secure by Letters Patent is:

1. A weed seed collector to be carried on a tractor comprising a U frame bar providing parallel arms, means pivotally attaching said arms to the tractor with the frame bar projecting forwardly thereof, means for extension of said arms, a castor wheel forwardly supporting said frame bar, an air suction fan and casing carried on the frame bar including an intake depending therefrom, means connectable to the tractor as a source of power for driving the suction fan, means by which the intake may be elevated at will, said means being operable from the tractor, stubble depressing means carried in advance of the intake, and a receptacle connected to receive material from the suction fan casing.

2. A weed seed collector to be carried on a tractor comprising a U frame bar providing parallel arms, means pivotally attaching said arms to the tractor with the frame bar projecting forwardly thereof, means for extension of said arms, a castor wheel forwardly supporting said frame bar, a suction fan and casing carried by the frame bar, means for driving the fan from the tractor as a source of power, said means including a speed shift gearing, means for shifting said gearing, a weed seed collecting device carried by the frame bar, said device including an intake and said device including suction means for drawing seeds through the intake, means operable from the driver's seat for elevating the intake at will, and a stubble depressing plate carried by the intake.

3. In a weed seed collector to be carried on a tractor, a frame, means pivotally mounting said frame projecting forwardly of the tractor, forward supporting means for the frame, a weed seed collecting apparatus mounted on the frame, said apparatus being of a character providing a container and suction means for drawing weed seeds to the container, an intake for said apparatus, said intake having a mouth extending across the path of travel of the tractor and a following implement, means by which the intake may be raised, said means including a cable connection for operation by the driver of the tractor, a stubble depressing plate, and means adjustably mounting said plate on the intake in advance thereof.

FRANK LLOYD NELSON.

REFERENCES CITED

The following references are of record in the file of this patent:

UNITED STATES PATENTS

| Number | Name | Date |
|---|---|---|
| 2,046,932 | Wyatt | July 7, 1936 |
| 2,328,713 | Dowd | Sept. 7, 1943 |

FOREIGN PATENTS

| Number | Country | Date |
|---|---|---|
| 18,233 | Australia | 1924 |